(12) United States Patent
Hunt et al.

(10) Patent No.: US 11,197,406 B2
(45) Date of Patent: Dec. 14, 2021

(54) LATERALLY OFFSET TRANSPORT WHEELS ON HARVESTING HEADER

(71) Applicant: CNH Industrial America LLC, New Holland, PA (US)

(72) Inventors: Cory D. Hunt, Millersville, PA (US); Lyle Beidler, Denver, PA (US); Stephen Todderud, Lancaster, PA (US)

(73) Assignee: CNH Industrial America LLC, New Holland, PA (US)

(*) Notice: Subject to any disclaimer, the term of this patent is extended or adjusted under 35 U.S.C. 154(b) by 342 days.

(21) Appl. No.: 16/206,055

(22) Filed: Nov. 30, 2018

(65) Prior Publication Data
US 2020/0170173 A1 Jun. 4, 2020

(51) Int. Cl.
*A01B 73/00* (2006.01)
*A01D 75/00* (2006.01)
*A01B 59/042* (2006.01)

(52) U.S. Cl.
CPC .......... *A01B 73/005* (2013.01); *A01B 59/042* (2013.01); *A01D 75/002* (2013.01)

(58) Field of Classification Search
CPC .. A01B 59/042; A01B 73/005; A01D 75/002; A01D 41/14–148
USPC .......... 280/409, 413, 462, 467, 472
See application file for complete search history.

(56) References Cited

U.S. PATENT DOCUMENTS

| | | | | | |
|---|---|---|---|---|---|
| 2,850,863 | A | * | 9/1958 | Pierson | A01D 57/20 56/192 |
| 2,996,307 | A | * | 8/1961 | Debailleux | A01B 73/005 280/656 |
| 3,245,695 | A | * | 4/1966 | Bernard | A01D 75/002 280/400 |
| 3,511,318 | A | * | 5/1970 | Boetto | A01B 73/005 172/240 |
| 3,620,308 | A | * | 11/1971 | Christopher | A01B 73/005 172/18 |
| 3,751,891 | A | * | 8/1973 | Molzahn | A01D 75/002 56/228 |
| 3,835,628 | A | * | 9/1974 | Case | A01D 67/00 56/14.4 |
| 4,329,833 | A | * | 5/1982 | Witzel | A01D 75/002 56/15.3 |

(Continued)

FOREIGN PATENT DOCUMENTS

| | | | |
|---|---|---|---|
| CA | 1188899 A | 6/1985 | |
| CA | 2895053 A1 | * 12/2016 | ........... A01D 75/002 |

(Continued)

OTHER PUBLICATIONS

Extended European Search Report for EP Application No. 19212234.9 dated May 6, 2020 (six pages).

*Primary Examiner* — Adam J Behrens
(74) *Attorney, Agent, or Firm* — Peter Zacharias; Patrick Sheldrake

(57) ABSTRACT

A transport system for a harvesting header including at least one dolly wheel being laterally shifted towards the main header frame with an acute angle relative to an elongate tongue where the acute angle allows the centerline of the harvesting header to travel essentially colinear with the centerline of the towing vehicle. The transport system may be further provided with gauge wheels being repositionable for use as a trailing wheel assembly and/or the at least one dolly wheel.

13 Claims, 3 Drawing Sheets

(56) References Cited

U.S. PATENT DOCUMENTS

| | | | | |
|---|---|---|---|---|
| 5,243,810 | A * | 9/1993 | Fox | A01B 73/005 |
| | | | | 56/14.4 |
| 5,361,569 | A * | 11/1994 | Schupman | A01D 75/002 |
| | | | | 280/47.131 |
| 5,970,695 | A * | 10/1999 | Dunn | A01B 73/005 |
| | | | | 172/311 |
| 6,209,297 | B1 * | 4/2001 | Yeomans | A01B 73/005 |
| | | | | 56/14.9 |
| 7,197,865 | B1 * | 4/2007 | Enns | A01B 73/005 |
| | | | | 56/228 |
| 7,926,249 | B1 * | 4/2011 | Cook | A01D 75/002 |
| | | | | 56/228 |
| 8,025,312 | B1 * | 9/2011 | Honas | A01D 75/002 |
| | | | | 280/769 |
| 8,117,812 | B2 * | 2/2012 | Patterson | A01D 75/002 |
| | | | | 56/228 |
| 8,621,836 | B2 | 1/2014 | Honas et al. | |
| 8,769,920 | B2 | 7/2014 | Patterson et al. | |
| 2015/0282427 | A1 * | 10/2015 | Honey | B60P 3/066 |
| | | | | 56/228 |
| 2020/0008341 | A1 * | 1/2020 | Madarasi | B25J 5/06 |
| 2020/0055545 | A1 * | 2/2020 | Chen | A01D 34/30 |

FOREIGN PATENT DOCUMENTS

| | | | | |
|---|---|---|---|---|
| DE | 8518163 | U1 | 10/1985 | |
| EP | 0350513 | A1 | 1/1990 | |
| EP | 1008285 | A1 * | 6/2000 | A01D 75/002 |
| EP | 1008285 | A1 | 6/2000 | |
| FR | 2644029 | A1 | 9/1990 | |
| FR | 3008276 | A1 | 1/2015 | |
| GB | 2176981 | A * | 1/1987 | A01B 73/005 |

\* cited by examiner

LATERALLY OFFSET TRANSPORT WHEELS ON HARVESTING HEADER

FIELD OF THE INVENTION

The present invention relates to harvesting headers, and, more particularly, to transportation of harvesting headers.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

Known harvesting headers are made up of many designs, e.g. corn header, grain header, etc., and typically are available in cutting widths exceeding a typical roadway width. To transport from one location to the next where the cutting width of the harvesting header exceeds the travel width, e.g. roadway width, the harvesting header may be towed transverse to its' cutting width. To facilitate towing in this manner, transport wheels are added to the harvesting header.

One known type of harvesting header has rigid frame members extending forward from the rear header frame to support the cutter bar. To transport this type of harvesting header, a fixed axle or stub axles are added transverse to the cutting width under the rear of the header, as viewed from the towing vehicle. At least one steerable wheel can be added under the header closer toward the towed vehicle. The at least one steerable wheel typically has a narrow track and is steerable by connection to a towed vehicle via a tongue. This at least one steerable wheel is often referred to as a dolly wheel. To attach the fixed axle and dolly wheel to the harvesting header, a combine raises the harvesting header, wherein the fixed axle and dolly wheel are attached under the harvesting header.

Another known harvesting header has a rigid rear frame with forward extending pivotable arms that support the cutter bar to cut the crop. To transport this type of harvesting header, additional structure is added to the frame for supporting the axle and dolly wheel as the forward extending frame members are not rigidly fixed to the frame and therefore are not suitable for supporting an axle and dolly wheel. Adding additional structure to the frame for supporting transport wheels greatly increases the weight of the harvesting header. This added weight results in higher fuel consumption and additional wear and tear on vehicles and roadways.

What is needed in the art is a lightweight and simple method of transporting a harvesting header.

SUMMARY OF THE INVENTION

In one exemplary embodiment formed in accordance with the present invention, there is provided a transport arrangement for an agricultural harvesting header. The harvesting header includes a main frame with a forward end located near the towing end of the towing vehicle when viewed in the direction of travel of the towing vehicle and a trailing end located at an end opposite of the forward end, a cutter bar disposed essentially parallel to the main frame and connected to the main frame, a harvesting header centerline disposed between the main frame and the cutter bar, an elongate tongue with a towed end and a distal end, a trailing wheel assembly, e.g. an assembly including at least two wheels and an axle or at least one gauge wheel reconfigured to be used as a trailing wheel, connecting to the harvesting header, and the least one dolly wheel, e.g. an assembly having a single wheel or a plurality of wheels configured to pivot about the same axis essentially parallel to a direction normal to the surface of the ground or at least one gauge wheel reconfigured to be used as a dolly wheel, connecting rigidly for instance, to the distal end of the elongate tongue, the at least one dolly wheel connecting to the harvesting header, wherein an acute angle is created between the elongate tongue and the direction of travel during transport, and the at least one dolly wheel configured to engage a ground surface behind the cutter bar in a lateral direction towards the main frame.

In another exemplary embodiment formed in accordance with the present invention, there is provided a system for transporting a harvesting header. A towing vehicle includes a hitch, a towing vehicle center line and a towing end. The harvesting header includes a main frame with a forward end located near the towing end of the towing vehicle when viewed in the direction of travel of the towing vehicle and a trailing end located at an end opposite of the forward end, a cutter bar disposed essentially parallel to the main frame and supported by a top deck, a harvesting header centerline disposed between the main frame and the cutter bar, an elongate tongue with a towed end and a distal end, a trailing wheel assembly, e.g. an assembly including at least two wheels and an axle or at least one gauge wheel reconfigured to be used as a trailing wheel, connecting to the harvesting header, and the least one dolly wheel, e.g. an assembly having a single wheel or a plurality of wheels configured to pivot about the same axis essentially parallel to a direction normal to the surface of the ground or at least one gauge wheel reconfigured to be used as a dolly wheel, connecting rigidly for instance, to the distal end of the elongate tongue, the at least one dolly wheel connecting to the harvesting header, wherein an acute angle is created between the elongate tongue and the direction of travel during transport, and the at least one dolly wheel configured to engage a ground surface behind the cutter bar in a lateral direction towards the main frame.

In yet another exemplary embodiment formed in accordance with the present invention, there is a method for transporting a harvesting header. The method includes the steps of: providing a towing vehicle with a hitch, a towing vehicle centerline, and a towing end; providing a harvesting header with a main frame with a forward end located near the towing end of the towing vehicle when viewed in the direction of travel of the towing vehicle and a trailing end being located at an end opposite the forward end, a cutter bar disposed essentially parallel to the main frame and supported by a top deck, and a harvesting header centerline disposed between the main frame and the cutter bar; providing an elongate tongue with a towed end and a distal end; providing a trailing wheel assembly, e.g. an assembly including at least two wheels and an axle or at least one gauge wheel reconfigured to be used as a trailing wheel; providing at least one dolly wheel, e.g. a single wheel or a plurality of wheels configured to pivot about the same axis essentially parallel to a direction normal to the surface of the ground or at least one gauge wheel reconfigured to be used as a dolly wheel; vertically raising the harvesting header with a device configured for lifting and lowering, such as a combine, from at least one ground contact surface to a height sufficient to connect the elongate tongue, the trailing wheel assembly, and the at least one dolly wheel; connecting the trailing wheel assembly to the harvesting header; connecting the at least one dolly wheel, e.g. rigidly, to the elongate tongue distal end; connecting the at least one dolly wheel to the harvesting header forming an acute angle between the elongate tongue and the direction of travel during transport, the at least one dolly wheel configured to engage a ground surface behind the cutter bar in a lateral direction towards the main header frame; vertically lowering the harvesting header with a device suited for lifting and lowering, such as a combine, to a height sufficient to engage the trailing wheel assembly and the at least one dolly wheel with the at least one ground contact surface; and pivotably connecting the elongate tongue towed end to a towing vehicle, wherein the towing vehicle centerline may be disposed essentially colinear to the harvesting header centerline.

An advantage of the present invention is a device that allows gauge wheels to be repositioned to serve as transport wheel(s).

Another advantage is weight reduction of the harvesting header through elimination of additional frame members used to support transport wheel(s).

Another advantage yet is allowing the harvesting header and a towing vehicle to share essentially the same centerline when in a transport condition.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
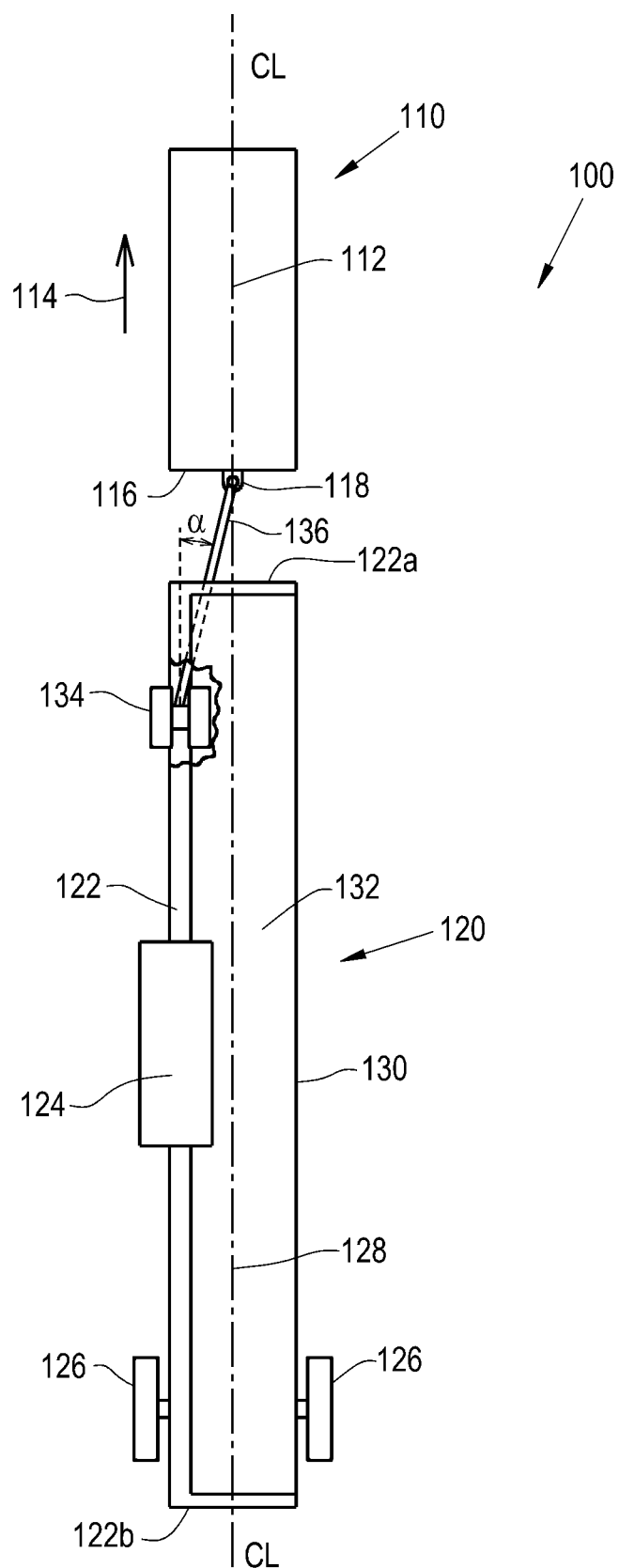
FIG. 1 is schematic top view of an embodiment of a system for transporting a harvesting header.

Referring now to the drawings, and more particularly to FIG. 1, there is shown a system 100 for transporting a harvesting header which generally includes a towing vehicle 110 and a harvesting header 120 wherein a centerline of the towing vehicle 110 may be disposed essentially colinear to a centerline of the harvesting header 120.

Towing vehicle 110 as shown in the illustrated embodiment is assumed to be an agricultural tractor but may also be any suitable form of vehicle used for towing. The towing vehicle 110 includes a towing vehicle centerline 112 disposed essentially longitudinally to a direction of travel 114, a rear or towing end 116 disposed essentially perpendicular to the direction of travel 114 and being located at the towing end 116 of the towing vehicle 110, and a hitch 118 located essentially on the centerline 112 and at the towing end 116 of the towing vehicle 110.

Harvesting header 120 generally includes a main frame 122. In the illustrated embodiment, the harvesting header 120 is shown in a transport orientation with the main frame 122 disposed essentially longitudinally to the towing vehicle 110 direction of travel 114. The harvesting header 120 further has a forward end 122a and a trailing end 122b relative to the direction of travel 114. The main frame 122 may include a discharge outlet and connection point 124 for a feeder housing of a combine (i.e., traction unit, not shown). A trailing wheel assembly 126 is connected to the harvesting header 120 at a location near the trailing end 122b. A harvesting header includes a longitudinally extending centerline 128 disposed essentially parallel with the towing vehicle 110 direction of travel 114 and located approximately equidistant between the main frame 122 and a cutter bar 130. A top deck 132, such as a draper belt or sheet metal for an auger, is configured for guiding a cut crop to the connection point 124 and is further adapted to support cutter bar 130. At least one dolly wheel 134 is attached to the harvesting header 120 at a location near the forward end 122a and laterally disposed from the centerline 128 towards the main frame 122 thereby positioning the at least one dolly wheel 134 closer to the main frame 122 and requiring less additional structural material. An elongate tongue 136 is attached to the at least one dolly wheel 134 forming an acute angle α between the elongate tongue 136 and the direction of travel 114 during transport. Examples of connections between the elongate tongue 136 and the at least one dolly wheel 134 include but are not limited to: pin, bolt, screw, and weld joints. The connection between the elongate tongue 136 and dolly wheel 134 can also be supported and/or reinforced as appropriate, such as with gussets, plates, brackets, etc. The elongate tongue 136 may be further adapted to connect to the hitch 118 of the towing vehicle 110.

The acute angle α may be any angle that is greater than 0° and less than 90°, preferably at an angle between 0° and 30°. In the illustrated embodiment, the angle α is approximately 15°. An acute angle α greater than 0° and less than 90° may provide that the towing vehicle 110 and the harvesting header 120 share essentially the same centerline. Shifting the at least one dolly wheel 134 laterally closer to the main frame 122 will not negatively affect the at least one dolly wheel 134 position relative to a center of gravity of the harvesting header 120 as most of the mass of the harvesting header 120 is along the main frame 122. The equation to determine the acute angle α needed to essentially provide the same centerline between the towing vehicle 110 and the harvesting header 120 is:

$$\alpha = \sin^{-1}\left(\frac{DW_O}{ET_L}\right)$$

Where α is an angle formed between the elongate tongue 136 and the direction of travel 114 during road transport, DWO is a lateral offset of at least one dolly wheel 134 from the harvesting header centerline 128 and ETL is the length of the elongate tongue 136 from the at least one dolly wheel 134 to an opposite end configured to attach to the hitch 118.

Figure 2:
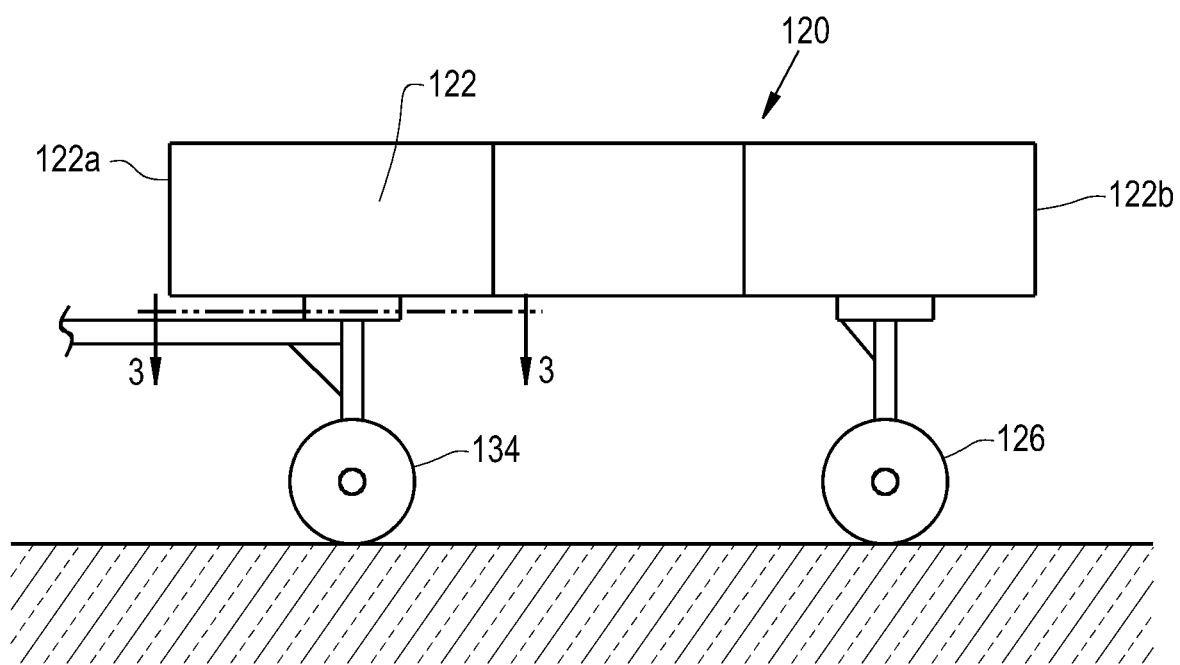
FIG. 2 is a schematic side view representing the system in FIG. 1 for transporting a harvesting header.

The connection between the elongate tongue 136 and the at least one dolly wheel 134 may provide an adjustable or a fixed acute angle. The acute angle α may be adjustable with a configurable connection between the elongate tongue and the at least one dolly wheel 134 to provide any angle that is greater than 0° and less than 90°. The acute angle may also be fixed with a rigid connection between the elongate tongue and the at least one dolly wheel 134 configured at a preset angle greater than 0° and less than 90°. The rigid connection may further allow the elongate tongue 136 to have freedom to move/rotate about an axis perpendicular to both the axis of rotation of the at least one dolly wheel 134 and either the direction of travel 114 or the length of the elongate tongue 136 to allow for movement of the elongate tongue 136 in upward and downward directions with respect to the forward end 122a of the main frame 122 as hills/valleys are traversed. In FIG. 2, a side view is shown of the embodiment of the harvesting header 120 in FIG. 1. In the illustrated embodiment, the at least one dolly wheel 134 attaches to the harvesting header 120 near the forward end 122a. The trailing wheel assembly 126 is attached the harvesting header 120 near the trailing end 122b.

Figure 3:
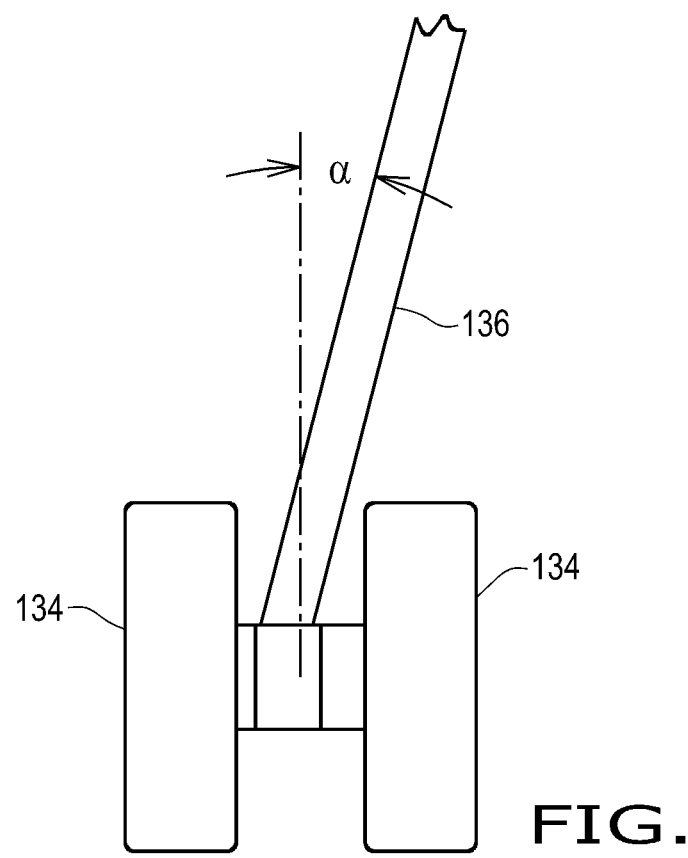
FIG. 3 is a schematic view of cross section 3-3 as shown in FIG. 2.

Referring now to FIG. 3, there is shown a cross section view of the at least one dolly wheel 134 attached to the elongate tongue 136. The attachment may allow or prevent disassembly of the at least one dolly wheel 134 from the elongate tongue 136. The structures that make up the attachment may include but are not limited to: pin, bolt, screw, and weld joints. It should also be noted that the attachment of the at least one dolly wheel 134 attached to the elongate tongue 136 results in an acute angle α being created between the elongate tongue 136 and the forward end 122a of the main frame 122 when the at least one dolly wheel 134 and the elongate tongue 136 are attached to the harvesting header 120. The attachment may allow for adjustment thereby provide an acute angle α of greater than 0° and less than 90°. It should also be appreciated that the at least one dolly wheel 134 may include a single wheel or a plurality of wheels.

Figure 4:
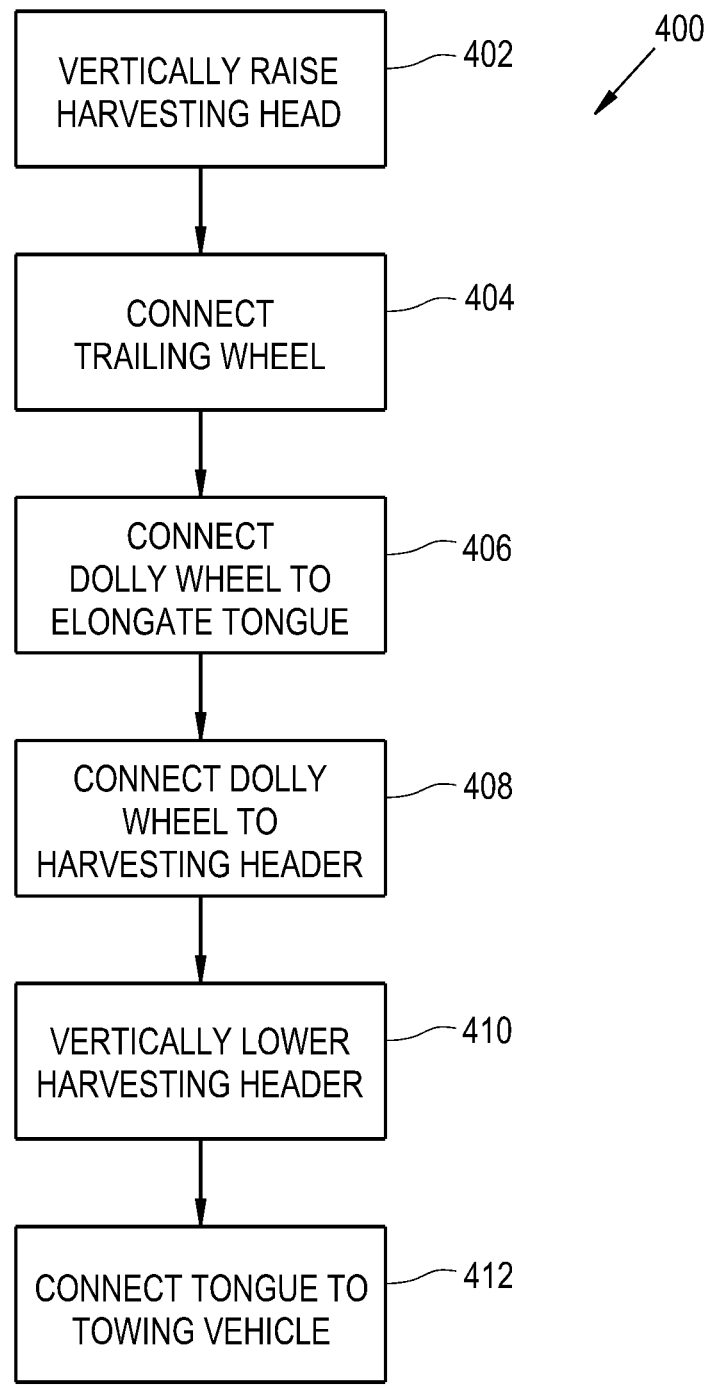
FIG. 4 is a flowchart of an embodiment of a method of the present invention for transporting a harvesting header.

Referring now to FIG. 4, there is shown a method 400 for transporting a harvesting header. The method generally includes the steps of vertically raising the harvesting header to a height sufficient to mount a trailing wheel assembly and at least one dolly wheel (step 402), connecting the trailing wheel assembly to the harvesting header (step 404), connecting rigidly for instance the at least one dolly wheel to the elongate tongue (step 406), connecting the at least one dolly wheel to the harvesting header (step 408), vertically lowering the harvesting header until the at least one trailing wheel and the at least one dolly wheel engage with the at least one ground contact surface (step 410), and then pivotably connecting the elongate tongue towed end to the hitch of the towing vehicle (step 412).

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural harvesting header, comprising:
a main frame extending along one side of the header, the main frame including a forward end and a rear trailing end relative to a direction of travel of the header during road transport;
a cutter bar positioned generally parallel to and opposite from the main frame; a longitudinal centerline of the header positioned between and parallel to the cutter bar and the main frame; and
a transport arrangement for transporting the header;
  a dolly assembly having at least one dolly wheel and detachably connected directly to the header near the forward end, between the main frame and the longitudinal centerline of the header;
  a trailing wheel assembly connected to the header near the rear trailing end; and
  an elongate tongue having a towed end and a distal end, the distal end being connected to the dolly assembly at an acute angle relative to the direction of travel during road transport, the towed end being positioned approximately coincident with the longitudinal centerline of the header, said dolly assembly being laterally disposed from the longitudinal centerline of the header, and wherein the distal end of the elongate tongue is rigidly connected to the dolly assembly.

2. The agricultural header of claim 1, wherein the dolly assembly includes at least one gauge wheel, and the trailing wheel assembly includes at least one gauge wheel.

3. The agricultural header of claim 1, wherein the distal end of the elongate tongue is connected to the dolly assembly at an acute angle of between 0° and 30°, relative to the direction of travel during road transport.

4. The agricultural header of claim 1, wherein the distal end of the elongate tongue is connected to the dolly assembly at an acute angle of approximately 15°.

5. The agricultural header of claim 1, wherein the dolly assembly includes a pair of wheels.

6. A transport system for an agricultural harvesting header, comprising:
a towing vehicle having a towing end and a hitch at the towing end; and
the agricultural harvesting header, comprising:
a main frame extending along one side of the header, the main frame including a forward end and a rear trailing end relative to a direction of travel of the header during road transport;
a cutter bar positioned generally parallel to and opposite from the main frame; a longitudinal centerline of the header positioned between and parallel to the cutter bar and the main frame; and
a transport arrangement for transporting the header;
  a dolly assembly having at least one dolly wheel and detachably connected directly to the header near the forward end, between the main frame and the longitudinal centerline of the header;
  a trailing wheel assembly connected to the header near the rear trailing end; and
  an elongate tongue having a towed end and a distal end, the distal end being connected to the dolly assembly at an acute angle relative to the direction of travel during road transport, the towed end being positioned approximately coincident with the longitudinal centerline of the header, said dolly assembly being laterally disposed from the longitudinal centerline of the header, and wherein the distal end of the elongate tongue is rigidly connected to the dolly assembly.

7. The transport system of claim 6, wherein the dolly assembly includes at least one gauge wheel, and the trailing wheel assembly includes at least one gauge wheel.

8. The transport system of claim 6, wherein the distal end of the elongate tongue is connected to the dolly assembly at an acute angle of between 0° and 30°, relative to the direction of travel during road transport.

9. The transport system of claim 6, wherein the distal end of the elongate tongue is connected to the dolly assembly at an acute angle of approximately 15°.

10. A method for transporting an agricultural harvesting header, comprising:
   providing a towing vehicle having a towing end and a hitch at the towing end;
   the agricultural harvesting header, comprising
   a main frame extending along one side of the header, the main frame including a forward end and a rear trailing end relative to a direction of travel of the header during road transport;
   a cutter bar positioned generally parallel to and opposite from the main frame; a longitudinal centerline of the header positioned between and parallel to the cutter bar and the main frame; and
   a transport arrangement for transporting the header;
   a dolly assembly having at least one dolly wheel;
   a trailing wheel assembly; and
   an elongate tongue having a towed end and a distal end;
   vertically raising the header;
   connecting the trailing wheel assembly near the rear trailing end;
   connecting the dolly assembly directly to the header near the forward end between the main frame and the longitudinal centerline of the header and laterally disposed from the longitudinal centerline of the header
   rigidly connecting the dolly assembly to the elongate tongue distal end forming an acute angle between the elongate tongue and the direction of travel during road transport;
   vertically lowering the header; and
   pivotably connecting the elongate tongue towed end to the hitch of the towing vehicle.

11. The method of claim 10, wherein the dolly assembly includes at least one gauge wheel, and the trailing wheel assembly includes at least one gauge wheel.

12. The method of claim 10, wherein the distal end of the elongate tongue is connected to the dolly assembly at an acute angle of between 0° and 30°, relative to the direction of travel during road transport.

13. The method of claim 10, wherein the distal end of the elongate tongue is connected to the dolly assembly at an acute angle of approximately 15°.

* * * * *